United States Patent
Nakano et al.

(10) Patent No.: US 9,455,594 B2
(45) Date of Patent: Sep. 27, 2016

(54) ELECTRONIC UNIT AND POWER FEEDING SYSTEM

(71) Applicant: Sony Corporation, Tokyo (JP)

(72) Inventors: Hiroaki Nakano, Kanagawa (JP); Toru Terashima, Kanagawa (JP); Keigo Bunsen, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 14/212,434

(22) Filed: Mar. 14, 2014

(65) Prior Publication Data

US 2014/0300189 A1 Oct. 9, 2014

(30) Foreign Application Priority Data

Apr. 8, 2013 (JP) .................. 2013-080430

(51) Int. Cl.
*H02J 7/02* (2016.01)
(52) U.S. Cl.
CPC ............ *H02J 7/025* (2013.01); *Y10T 307/406* (2015.04)
(58) Field of Classification Search
CPC ..................................... H02J 7/025
USPC ......................................... 307/104
See application file for complete search history.

(56) References Cited

FOREIGN PATENT DOCUMENTS

| JP | 2001-102974 A | 4/2001 |
|---|---|---|
| JP | 2002-034169 A | 1/2002 |
| JP | 2005-110399 A | 4/2005 |
| JP | 2008-206233 A | 9/2008 |
| JP | 2010-063245 A | 3/2010 |
| WO | WO-00/27531 | 5/2000 |

*Primary Examiner* — Robert Deberadinis
(74) *Attorney, Agent, or Firm* — Michael Best & Friedrich LLP

(57) ABSTRACT

An electronic unit includes: an electricity reception section configured to receive power fed from a power feeding unit using a magnetic field; a voltage detection section configured to detect a received voltage supplied from the electricity reception section; and a control section, wherein while preliminary power feeding at a lower power than main power feeding is performed from the power feeding unit, and when a received voltage detected by the voltage detection section is equal to or higher than a predetermined threshold voltage, the control section performs voltage reduction control so as to decrease the received voltage to lower than the threshold voltage.

14 Claims, 14 Drawing Sheets

COMPARATIVE EXAMPLE 1

| RECEIVED POWER (W) | EFFICIENCY OF POWER FEEDING SYSTEM AS A WHOLE (%) | NECESSARY POWER TO BE FED (W) | POWER LOSS IN DC/DC CONVERTER (EFFICIENCY=90%) (W) |
|---|---|---|---|
| 5 | 80 | 6.25 | 0.625 |
| 10 | 80 | 12.50 | 1.250 |
| 15 | 80 | 18.75 | 1.875 |

ELECTRONIC UNIT AND POWER FEEDING SYSTEM

CROSS REFERENCE TO RELATED APPLICATIONS

This application claims the benefit of Japanese Priority Patent Application JP 2013-80430 filed Apr. 8, 2013, the entire contents of which are incorporated herein by reference.

BACKGROUND

The present disclosure relates to a power feeding system that performs power supply (power feeding, electricity transmission, or power transmission) in a noncontact manner to an objective unit such as an electronic unit, and to an electronic unit applicable to such a power feeding system.

Recently, a power feeding system (a noncontact power feeding system or a wireless charging system), which supplies power in a noncontact manner to consumer electronics (CE) devices such as a mobile phone and a portable music player, is the subject of interest. Such a noncontact power feeding system makes it possible to start charge only by placing an electronic unit (a secondary unit) on a charge tray (a primary unit) instead of starting charge by inserting (connecting) a connector of a power supply unit, such as an AC adaptor, into a unit. In other words, such a system eliminates necessity of terminal connection between the electronic unit and the charge tray.

A method of performing such noncontact power supply is roughly classified into two techniques. A first technique is a widely known, electromagnetic induction method capable of efficient power feeding due to its extremely high coupling degree between an electricity transmission side (primary side) and an electricity reception side (secondary side). A second technique is a so-called magnetic resonance method that is characterized in that a small amount of magnetic flux may be satisfactorily shared by the electricity transmission side and the electricity reception side by actively using a resonant phenomenon.

In recent years, the trend of standardization has been developing, and standardization is actively advanced mainly by an industry group named Wireless Power Consortium (WPC). The standardization enables compatibility between products of different enterprises, and enables charge in many combinations of primary units and secondary units. For example, Japanese Unexamined Patent Application Publication Nos. 2001-102974, 2008-206233, 2002-34169, 2005-110399, and 2010-63245, and International Patent Application WO 00/27531 each disclose such a noncontact power feeding system.

SUMMARY

Such a noncontact power feeding system is being further investigated to achieve a noncontact feeding system of higher power. It is therefore desired to propose a technique that makes it possible to appropriately perform control during power feeding using a magnetic field.

It is desirable to provide an electronic unit and a power feeding system capable of appropriately performing control during power feeding using a magnetic field.

According to an embodiment of the present disclosure, there is provided an electronic unit, including: an electricity reception section configured to receive power fed from a power feeding unit using a magnetic field; a voltage detection section configured to detect a received voltage supplied from the electricity reception section; and a control section, wherein while preliminary power feeding at a lower power than main power feeding is performed from the power feeding unit, and when a received voltage detected by the voltage detection section is equal to or higher than a predetermined threshold voltage, the control section performs voltage reduction control so as to decrease the received voltage to lower than the threshold voltage.

According to an embodiment of the present disclosure, there is provided a power feeding system, including: one or more electronic units; and a power feeding unit configured to perform power feeding to the electronic unit using a magnetic field, wherein the electronic unit includes an electricity reception section that receives power fed from the power feeding unit, a voltage detection section that detects a received voltage supplied from the electricity reception section, and a control section, wherein while preliminary power feeding at a lower power than main power feeding is performed from the power feeding unit, and when a received voltage detected by the voltage detection section is equal to or higher than a predetermined threshold voltage, the control section performs voltage reduction control so as to decrease the received voltage to lower than the threshold voltage.

In the electronic unit and the power feeding system according to the above-described respective embodiments of the present disclosure, when a received voltage, which is detected during preliminary power feeding from the power feeding unit, is equal to or higher than the predetermined threshold voltage, voltage reduction control is performed so as to decrease the received voltage to lower than the threshold voltage. Consequently, the received voltage is avoided from excessively increasing during subsequent main power feeding (at higher power than the preliminary power feeding).

According to the electronic unit and the power feeding system of the above-described respective embodiments of the present disclosure, when a received voltage, which is detected during preliminary power feeding from the power feeding unit, is equal to or higher than the predetermined threshold voltage, voltage reduction control is performed so as to decrease the received voltage to lower than the threshold voltage. As a result, the received voltage is allowed to be avoided from excessively increasing during subsequent main power feeding. Consequently, it is possible to perform appropriate control during power feeding using a magnetic field.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, an embodiment of the present disclosure is described in detail with reference to the accompanying drawings. It is to be noted that description is made in the following order.

1. Embodiment (Example of a case where a received voltage is decreased using a dummy load).
2. Modifications Modification 1 (Example of selectively using a plurality of types of dummy loads in accordance with a level of a received voltage).

Modification 2 (Example of decreasing a received voltage by controlling a load current).

3. Other Modifications

EMBODIMENT

[Overall Configuration of Power Feeding System 4]

Figure 1:
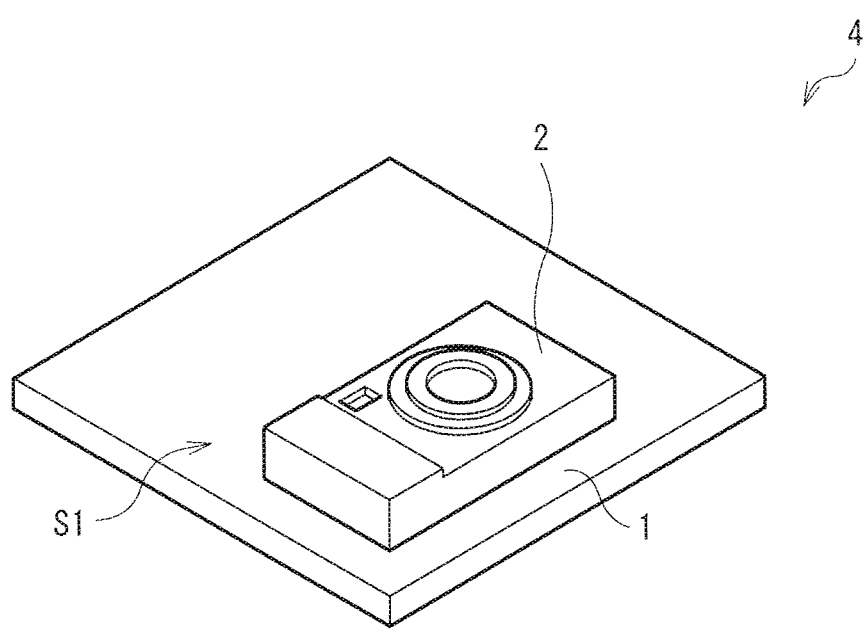
FIG. 1 is a perspective diagram illustrating an exemplary appearance configuration of a power feeding system according to an example embodiment of the present disclosure.
Figure 2:
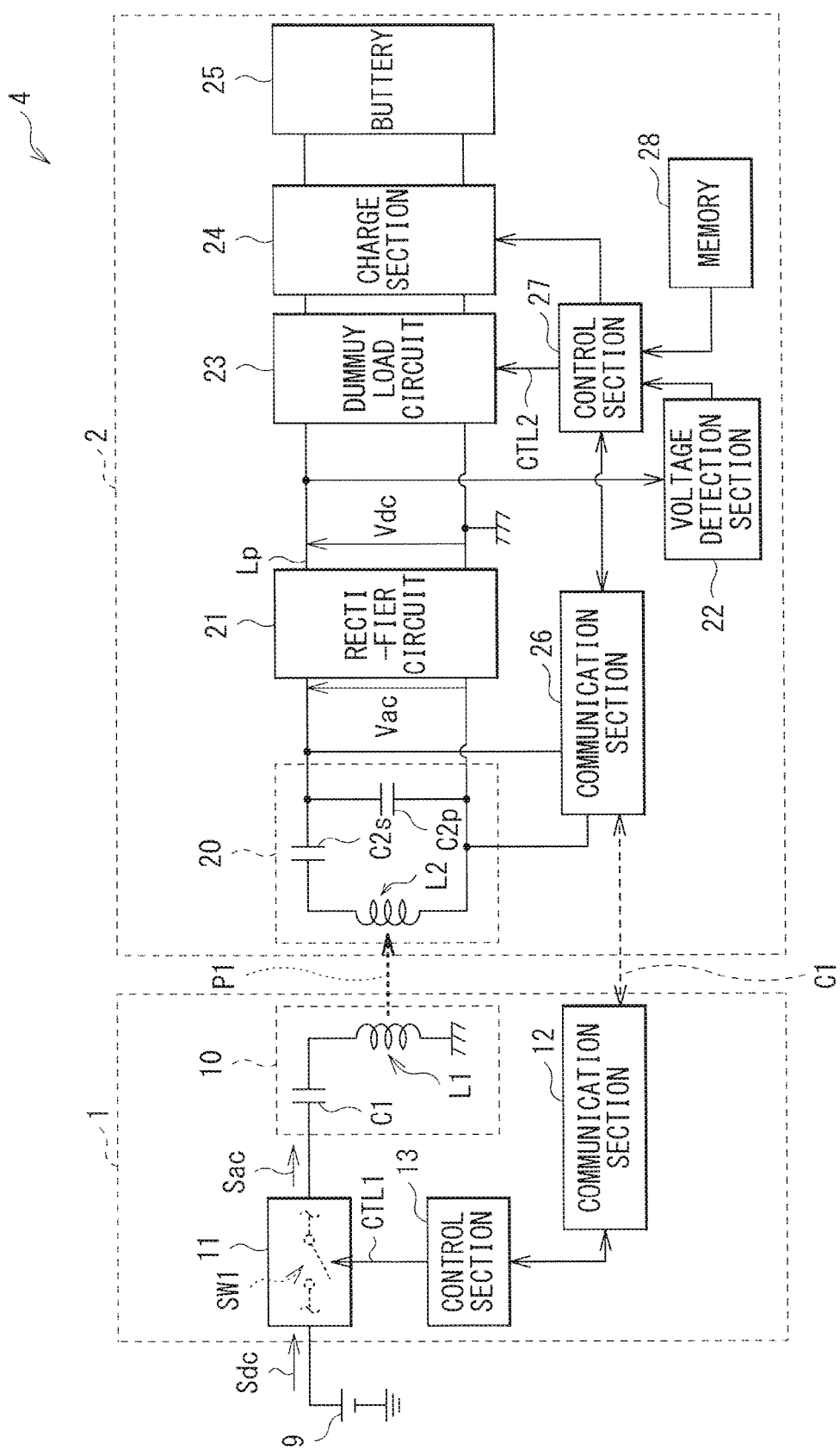
FIG. 2 is a diagram illustrating an exemplary detailed configuration of the power feeding system illustrated in FIG. 1.

FIG. 1 illustrates an exemplary appearance configuration of a power feeding system (power feeding system 4) according to an embodiment of the present disclosure. FIG. 2 is a block diagram as a circuit diagram that illustrates an exemplary detailed configuration of the power feeding system 4. The power feeding system 4 is a system (noncontact power feeding system) that performs power transmission (power supply, power feeding, or electricity transmission) in a noncontact manner using a magnetic field (using magnetic resonance, electromagnetic induction, or the like; the same holds true hereinafter). The power feeding system 4 includes a power feeding unit 1 (primary unit) and one or more electronic units (here, one electronic unit 2; a secondary unit) as an objective unit of power feeding.

In the power feeding system 4, for example, as illustrated in FIG. 1, the electronic unit 2 is placed on (or disposed close to) a power feeding surface (an electricity transmission surface) S1 of the power feeding unit 1, thereby power transmission is performed from the power feeding unit 1 to the electronic unit 2. In this exemplary case, the power feeding unit 1 is in a mat shape (tray shape), in which area of the power feeding surface S1 is larger than area of the electronic unit 2 as a power feeding object, etc.

(Power Feeding Unit 1)

As described above, the power feeding unit 1 is a unit (charge tray) configured to feed power to the electronic unit 2 using a magnetic field. For example, as illustrated in FIG. 2, the power feeding unit 1 may include an electricity transmission section 10, an AC signal generation circuit (an AC signal generation section or a high-frequency power generation circuit) 11, a communication section 12, and a control section 13.

The electricity transmission section 10 includes an electricity transmission coil (a primary coil) L1, a capacitor C1 (resonance capacitor), and the like. Such an electricity transmission coil L1 and a capacitor C1 are electrically connected in series to each other. Specifically, a first end of the electricity transmission coil L1 is connected to a first end of the capacitor C1, a second end of the electricity transmission coil L1 is grounded, and a second end of the capacitor C1 is connected to an output terminal of the AC signal generation circuit 11. The electricity transmission section 10 uses such an electricity transmission coil L1 and a capacitor C1 to feed power to the electronic unit 2 (in detail, an electricity reception section 20 described later) using an AC magnetic field (see an arrow P1 in FIG. 2). Specifically, the electricity transmission section 10 has a function of radiating a magnetic field (magnetic flux) from the power feeding surface S1 to the electronic unit 2.

The electricity transmission section 10 includes an LC resonance circuit that is configured of the electricity transmission coil L1 and the capacitor C1. The LC resonance circuit formed in the electricity transmission section 10 and an LC resonance circuit formed in the electricity reception section 20 described later are designed to be magnetically coupled to each other (mutual induction).

For example, the AC signal generation circuit 11 may be a circuit configured to use power (a DC signal Sdc) supplied from an external power supply 9 (a parent power supply) of the power feeding unit 1 to generate a predetermined AC signal Sac (high-frequency power) for performing power feeding. The AC signal Sac is supplied to the electricity transmission section 10. Examples of the external power supply 9 may include a typical AC adaptor, and a power supply (power supplying capability: 500 mA and a power voltage: about 5V) of universal serial bus (USB) 2.0 provided in a personal computer (PC), etc.

For example, as described later, such an AC signal generation circuit 11 may be configured of a switching amplifier (so-called a class E amplifier, a differential amplifier, or the like) containing one or more switching elements SW1 configured of metal oxide semiconductor (MOS) transistors, or the like. The switching element SW1 is configured to receive control signals CTL1 for power feeding from the control section 13. The configuration of the AC signal generation circuit 11 is described in detail later.

The communication section 12 is configured to mutually perform predetermined communication operation with a communication section 26 described later in the electronic unit 2 (see an arrow C1 in FIG. 2).

The control section 13 is configured to perform various types of control operation in the power feeding unit 1 as a whole (or the power feeding system 4 as a whole). Specifically, the control section 13 performs control of electricity transmission operation of the electricity transmission section 10 and control of communication operation of the communication section 12. In addition, for example, the control section 13 may have a function of optimization control of power to be fed, an authentication function of an objective unit of power feeding, a function of detecting a proximate objective unit of power feeding, and a function of detecting contamination of a dissimilar metal, etc. In the above-described control of electricity transmission operation, the control section 13 uses the above-described control signals CTL1 to control operation of the AC signal generation circuit 11. For example, such a control section 13 may be configured of a microcomputer, a pulse generator, and the like. The operation of controlling the AC signal generation circuit 11 by the control section 13 is described in detail later.

(Electronic Unit 2)

For example, the electronic unit 2 may be a standalone electronic unit typified by a television receiver, a portable electronic unit containing a battery typified by a mobile phone and a digital camera, etc. For example, as illustrated in FIG. 2, the electronic unit 2 includes the electricity reception section 20, a rectifier circuit 21, a voltage detection section 22, a dummy load circuit 23, a charge section 24, a battery 25, a communication section 26, a control section 27, and a memory section 28. The dummy load circuit 23 corresponds to a specific but not limitative example of "voltage reduction section" in one embodiment of the present disclosure.

The electricity reception section 20 includes an electricity reception coil (secondary coil) L2, capacitors C2s and C2p (resonance capacitors), and the like. The electricity reception coil L2 and the capacitor C2s are electrically connected in series to each other, while the electricity reception coil L2 and the capacitor C2p are electrically connected in parallel to each other. Specifically, a first end of the capacitor C2s is connected to a first input terminal of the rectifier circuit 21 and a first end of the capacitor C2p, while a second end of the capacitor C2s is connected to a first end of the electricity reception coil L2. A second end of the electricity reception coil L2 is connected to a second input terminal of the rectifier circuit 21 and a second end of the capacitor C2p. The electricity reception section 20 has a function of using the electricity reception coil L2, the capacitors C2s and C2p, and the like to receive power (fed power) transmitted from the electricity transmission section 10 in the power feeding unit 1.

The electricity reception section 20 includes an LC resonance circuit that is configured of the electricity reception coil L2 and the capacitors C2s and C2p. As described before, the LC resonance circuit formed in the electricity reception section 20 is magnetically coupled with the LC resonance circuit formed in the electricity transmission section 10. Consequently, LC resonance operation is performed at a resonance frequency that is substantially equal to a frequency of the high-frequency power (AC signal Sac) generated by the AC signal generation circuit 11.

The rectifier circuit 21 is a circuit configured to rectify a received voltage (AC voltage) supplied from the electricity reception section 20 to generate a DC voltage. In other words, the rectifier circuit 21 rectifies an AC received voltage (AC received voltage Vac) supplied from the electricity reception section 20 to generate a DC received voltage (DC received voltage Vdc). For example, the rectifier circuit 21 may be a circuit in a bridge configuration including a plurality of rectifier elements (diodes). For example, the rectifier circuit 21 may be a synchronous rectifier circuit including transistors.

The voltage detection section 22 is configured to detect the received voltage supplied from the electricity reception section 20. In particular, in this exemplary case, the voltage detection section 22 detects the received voltage (DC received voltage Vdc), which has been rectified by the rectifier circuit 21, on a downstream side of the rectifier circuit 21 on a power supply line Lp. The DC received voltage Vdc detected in this way is output to the control section 27. For example, such a voltage detection section 22 may be configured of a resistance voltage divider, an analog to digital converter (ADC), or the like.

The dummy load circuit 23 is disposed between the rectifier circuit 21 and the charge section 24 on the power supply line Lp, and may include one or more dummy loads (dummy resistances, etc.). When a predetermined condition described later is satisfied, the dummy load circuit 23 performs operation (voltage reduction operation) of decreasing the received voltage (the DC received voltage Vdc in this exemplary case) in accordance with control (a control signal CTL2) from the control section 27. The configuration of the dummy load circuit 23 and the voltage reduction operation are described in detail later.

The charge section 24 is configured to perform operation of charging the battery 25 as a main load based on the DC power output from the rectifier circuit 21.

The battery 25 is configured to store power in accordance with the charge operation of the charge section 24, and may be configured of a battery (secondary battery) such as, for example, a lithium ion battery.

The communication section 26 is configured to mutually perform the above-described predetermined communication operation with the communication section 12 in the power feeding unit 1 (see the arrow C1 in FIG. 2).

The control section 27 is configured to perform various types of control operation in the electronic unit 2 as a whole (or power feeding system 4 as a whole). Specifically, the control section 24 performs control of electricity reception operation of the electricity reception section 20 and control of the communication operation of the communication section 26. In addition, for example, the control section 24 may have a function of optimization control of power to be received, and a function of controlling the charge operation of the charge section 24.

In this embodiment, while preliminary power feeding at a lower power than the main power feeding is performed from the power feeding unit 1 (at start operation), and when the received voltage (DC received voltage Vdc) detected by the voltage detection section 22 is equal to or higher than a predetermined threshold voltage Vth (Vdc≥Vth), the control section 27 performs the following voltage reduction control. Specifically, in such a case, the control section 27 performs the voltage reduction control such that the DC received voltage Vdc is decreased to lower than the threshold voltage Vth (Vdc<Vth). More specifically, for example, the control section 27 may use one or more of the dummy loads in the above-described dummy load circuit 23 to perform such voltage reduction control. For example, such a control section 27 may be configured of a microcomputer, etc. The voltage reduction control operation of the control section 27 is described in detail later.

The memory section 28 is configured to store the various types of information that are to be used by the control section 27. Specifically, for example, the memory section 28 stores information of the above-described threshold voltage Vth, etc.

[Exemplary Detailed Configuration of AC Signal Generation Circuit 11]

Figure 3:
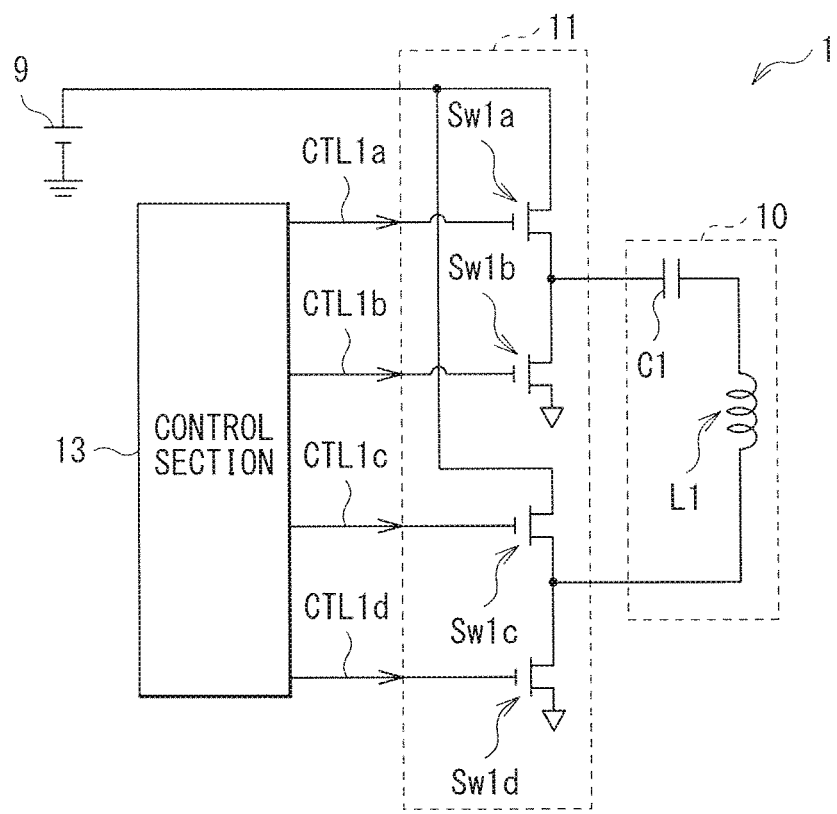
FIG. 3 is a circuit diagram illustrating an exemplary detailed configuration of an AC signal generation circuit illustrated in FIG. 2.

An exemplary detailed configuration of the above-described AC signal generation circuit 11 is now described with reference to FIGS. 3, 4, 5A and 5B. FIG. 3 illustrates an exemplary circuit configuration of the AC signal generation circuit 11 together with an external power supply 9, the electricity transmission section 10, and the control section 13.

In this exemplary case, the AC signal generation circuit 11 has a bridge circuit configuration using four switching elements SW1a, SW1b, SW1c, and SW1d as the above-described switching elements SW1. In this exemplary case, such switching elements SW1a, SW1b, SW1c, and SW1d are each configured of a MOS transistor. In the AC signal generation circuit 11, the respective gates of the switching elements SW1a, SW1b, SW1c, and SW1d independently receive control signals CTL1a, CTL1b, CTL1c, and CTL1d, respectively, as the above-described control signals CTL1. Sources of the switching element SW1a and SW1c are each connected to a connection line from the external power supply 9. A drain of the switching element SW1a is connected to a drain of the switching element SW1b, and a drain of the switching element SW1c is connected to a drain of the switching element SW1d. Sources of the switching elements SW1b and SW1d are each connected to ground (earth). The drains of the switching elements SW1a and SW1b are each connected to a first end of the capacitor C1 in the electricity transmission section 10, and the drains of the switching element SW1c and SW1d are each connected to a first end of the electricity transmission coil L1 in the electricity transmission section 10.

Figure 4:
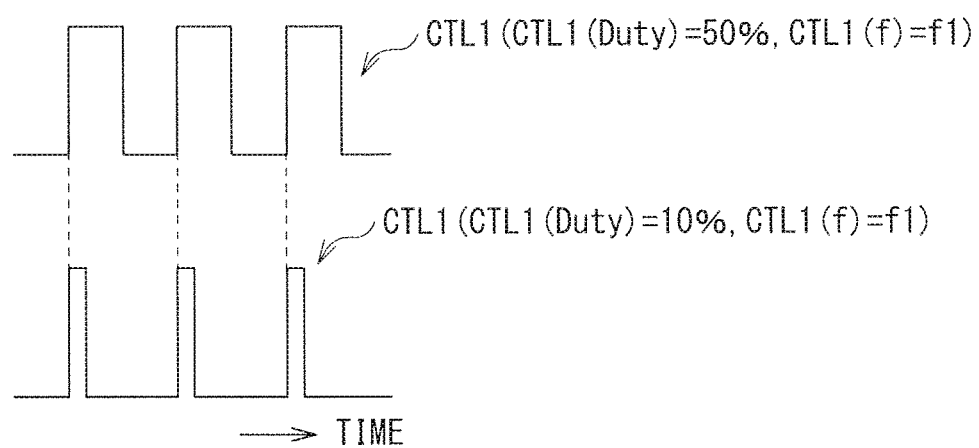
FIG. 4 is a timing waveform diagram illustrating an exemplary control signal for the AC signal generation circuit.

For example, as illustrated in FIG. 4, the control signals CTL1 (CTL1a, CTL1b, CTL1c, and CTL1d) are each a pulse signal having a predetermined frequency f (CTL1(f)=f1) and a predetermined duty ratio Duty (CTL1 (Duty)=10%, 50%, or the like). As illustrated in FIG. 4, pulse width modulation (PWM) is performed through control of the duty ratio Duty of each control signal CTL1.

According to such a configuration, in the AC signal generation circuit 11, the switching elements SW1a, SW1b, SW1c, and SW1d perform ON/OFF operation (switching operation at the frequency f and the duty ratio Duty) in accordance with the control signals CTL1a, CTL1b, CTL1c, and CTL1d, respectively. Specifically, ON/OFF operation of the switching element SW1 is controlled using the control signals CTL1 supplied from the control section 13. Consequently, for example, the AC signal Sac is generated based on the DC signal Sdc received from the external power supply 9, and is supplied to the electricity transmission section 10.

In the AC signal generation circuit 11, a circuit configuration is switchable as below between a full-bridge circuit and a half-bridge circuit in accordance with the control signals CTL1a, CTL1b, CTL1c, and CTL1d. Consequently, a voltage is allowed to be varied during power feeding in accordance with control of switching operation without varying a hardware configuration.

Figure 5A:
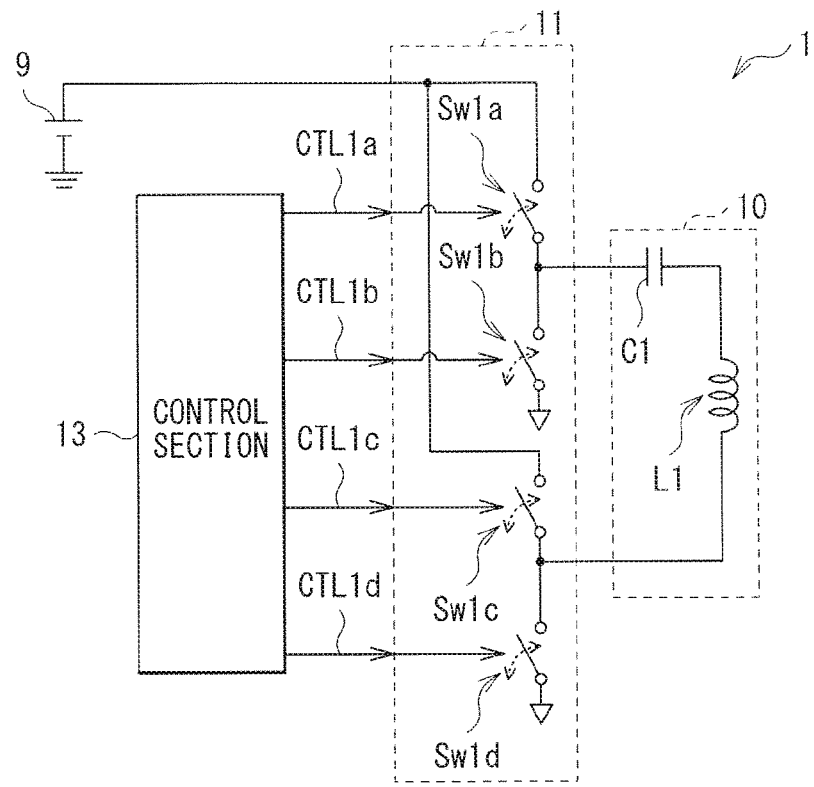
FIG. 5A is a circuit diagram schematically illustrating an exemplary operation of the AC signal generation circuit illustrated in FIG. 3.

Specifically, for example, as illustrated in FIG. 5A, when the four switching elements SW1a, SW1b, SW1c, and SW1d each perform ON/OFF operation, the circuit has a configuration of the full-bridge circuit.

Figure 5B:
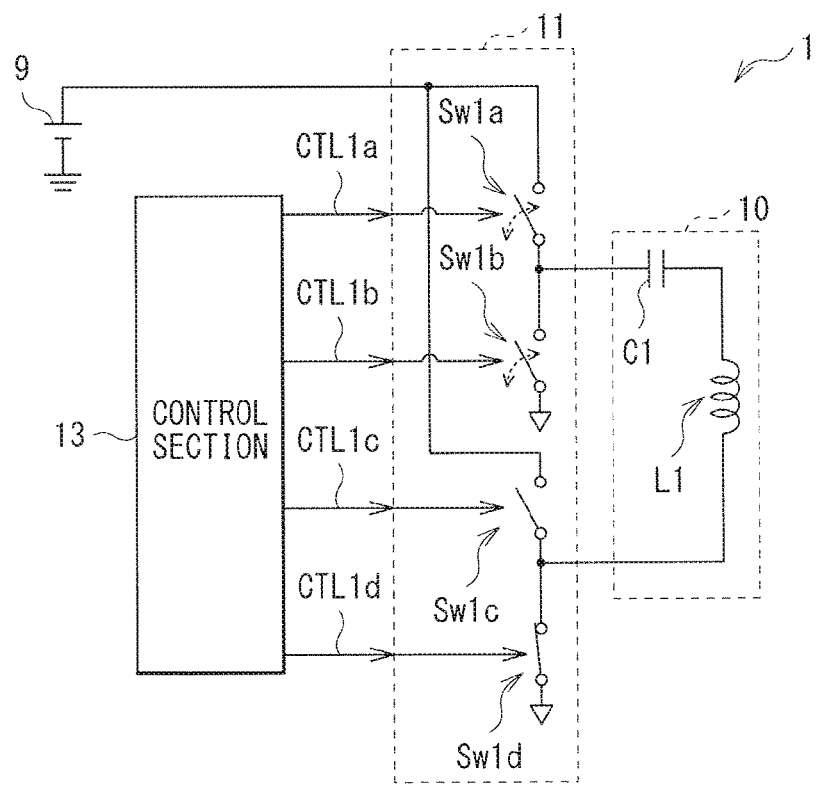
FIG. 5B is a circuit diagram schematically illustrating another exemplary operation of the AC signal generation circuit illustrated in FIG. 3.

For example, as illustrated in FIG. 5B, when the two switching elements SW1a and SW1b each perform ON/OFF operation, the switching element SW1c is continuously OFF, and the switching element SW1d is continuously ON, the circuit configuration is as follows. Specifically, in this case, the circuit configuration is equivalent to a half-bridge circuit configured of the two switching elements SW1a and SW1b. Consequently, in this case, a voltage (voltage to be fed) generated by the AC signal generation circuit 11 during power feeding is about half the voltage generated in case of the full-bridge circuit illustrated in FIG. 5A. In FIGS. 5A and 5B and subsequent similar drawings, each switching element is schematically shown in a form of a switch in order to facilitate understanding of an operation state thereof.

[Exemplary Detailed Configuration of Dummy Load Circuit 23]

Figure 6:
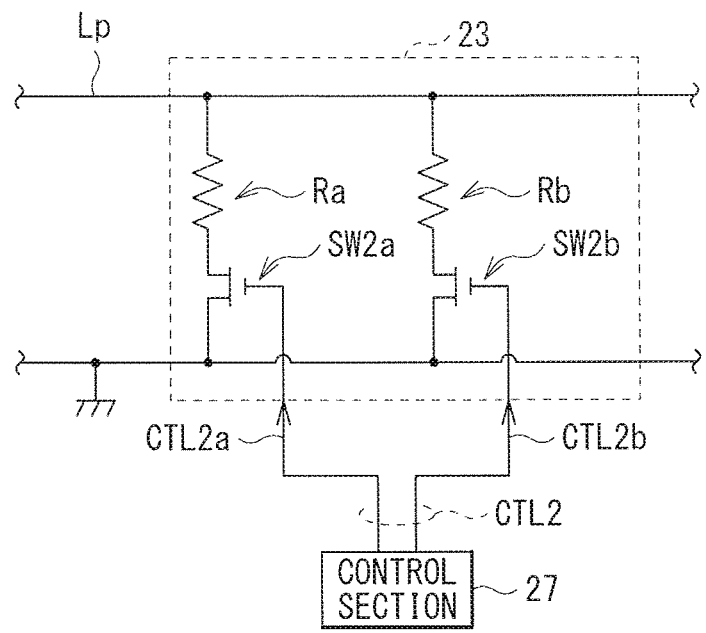
FIG. 6 is a circuit diagram illustrating an exemplary detailed configuration of a dummy load circuit illustrated in FIG. 2.

An exemplary detailed configuration of the above-described dummy load circuit 23 is now described with reference to FIGS. 6 and 7. FIG. 6 illustrates an exemplary detailed configuration of the dummy load circuit 23 together with the control section 27.

In this exemplary case, the dummy load circuit 23 includes two dummy loads Ra and Rb configured of resistance elements (dummy resistances), and two switching elements SW2a and SW2b configured of MOS transistors. The dummy load Ra and the switching element SW2a are connected in series to each other between the power supply line Lp and a ground line, and the dummy load Rb and the switching element SW2b are connected in series to each other between the power supply line Lp and the ground line. Specifically, a first end of the dummy load Ra is connected to the power supply line Lp, a second end of the dummy load Ra is connected to the drain of the switching element SW1a, and a source of the switching element SW1a is connected to the ground line. Similarly, a first end of the dummy load Rb is connected to the power supply line Lp, a second end of the dummy load Rb is connected to the drain of the switching element SW1b, and a source of the switching element SW1b is connected to the ground line. Such an element pair of the dummy load Ra and the switching element SW1a and an element pair of the dummy load Rb and the switching element SW1b are disposed in parallel to each other. The gates of the switching elements SW2a and SW2b independently receive the control signals CTL2a and CTL2b, respectively, as the above-described control signals CTL2.

According to such a configuration, the dummy load circuit 23 is set such that the two switching elements SW2a and SW2b are independently ON or OFF in accordance with the control signals CTL2a and CTL2b supplied from the control section 27. As a result, the dummy load circuit 23 is configured such that the two dummy loads Ra and Rb are independently connected or disconnected between supply lines of the DC received voltage Vdc (between the power supply line Lp and a ground line).

Figure 7:
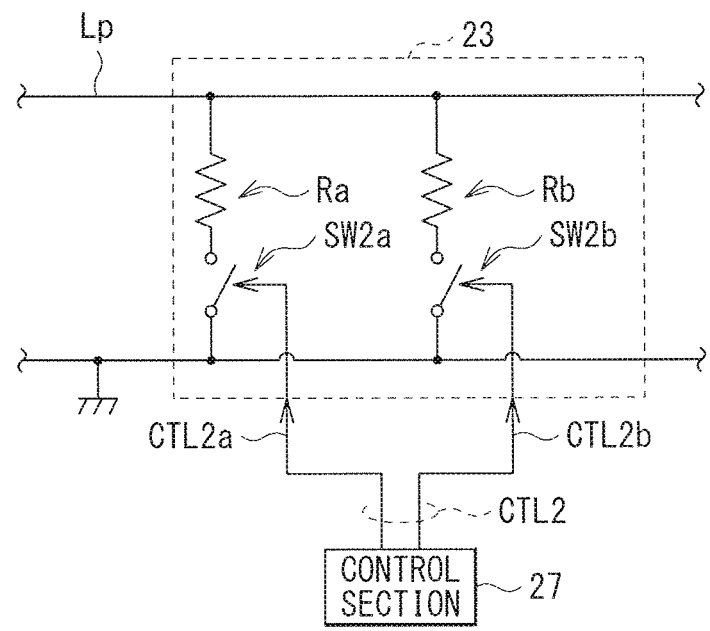
FIG. 7 is a circuit diagram schematically illustrating an exemplary state of the dummy load circuit illustrated in FIG. 6.

For example, as illustrated in FIG. 7, the dummy load circuit 23 is set such that both the switching elements SW2*a* and SW2*b* are OFF during normal operation (in any case other than the case of satisfying (Vdc≥Vth) as described later). Specifically, the dummy load circuit 23 is set such that both the dummy loads Ra and Rb are disconnected between the supply lines of the DC received voltage Vdc.

[Functions and Effects of Power Feeding System 4]

(1. Summary of Overall Operation)

In the power feeding system 4, the AC signal generation circuit 11 in the power feeding unit 1 supplies predetermined high-frequency power (an AC signal Sac) for electricity transmission to the electricity transmission coil L1 and the capacitor C1 in the electricity transmission section 10 based on power supplied from the external power supply 9. Consequently, the electricity transmission coil L1 in the electricity transmission section 10 generates a magnetic field (magnetic flux). At this time, when the electronic unit 2 as an objective unit of power feeding is placed on (or disposed close to) a top (the power feeding surface S1) of the power feeding unit 1, the electricity transmission coil L1 in the power feeding unit 1 becomes proximate to the electricity reception coil L2 in the electronic unit 2 in the vicinity of the power feeding surface S1.

In this way, when the electricity reception coil L2 is disposed close to the electricity transmission coil L1 generating a magnetic field, electromotive force (induced electromotive force) is induced in the electricity reception coil L2 by the magnetic flux generated from the electricity transmission coil L1. In other words, the magnetic field is generated by electromagnetic induction or magnetic resonance while interlinking with each of the electricity transmission coil L1 and the electricity reception coil L2. Consequently, power is transmitted from the electricity transmission coil L1 side (the primary side, the power feeding unit 1 side, or the electricity transmission section 10 side) to the electricity reception coil L2 side (the secondary side, the electronic unit 2 side, or the electricity reception section 20 side) (see the arrow P1 in FIG. 2). At this time, the electricity transmission coil L1 in the power feeding unit 1 is magnetically coupled with the electricity reception coil L2 in the electronic unit 2, leading to LC resonance operation.

In the electronic unit 2, the AC power received by the electricity reception coil L2 is then supplied to the charge section 24 via the rectifier circuit 21, and, for example, the following charge operation may be performed. Specifically, an AC voltage (AC current) is converted into a predetermined DC voltage (DC current) by the rectifier circuit 21, and then the charge section 24 charges the battery 25 based on the DC voltage. In this way, in the electronic unit 2, charge operation is performed based on the power received by the electricity reception section 20.

In other words, this embodiment eliminates necessity of terminal connection to, for example, an AC adaptor during charge of the electronic unit 2, and thus makes it possible to easily start charge only by placing the electronic unit 2 on (or disposing the electronic unit 2 close to) the power feeding surface S1 of the power feeding unit 1 (i.e., allows noncontact power feeding). This leads to reduction in work of a user.

During such operation, mutual communication operation is performed between the communication section 12 in the power feeding unit 1 and the communication section 26 in the electronic unit 2 (see the arrow C1 in FIG. 2). For example, mutual authentication between the units, control of power feeding efficiency, and the like may be performed through such mutual communication operation.

(2. Reduction Operation of Received Voltage)

Such a noncontact power feeding system is being further investigated to achieve a noncontact feeding system of higher power. In most of the commercially available, noncontact power feeding systems at present, the power to be received is 1 W, 2.5 W, or 5 W, and is promisingly increased to 10 W or 15 W in future. Therefore, an issue of downward compatibility occurs. Specifically, the primary unit is necessary to cover a wide power range in correspondence to power requested by the secondary unit. In addition, an appropriate power feeding voltage is necessary to be set in the primary side in order to cover such a wide power range. This is because the voltage (received voltage) in the secondary side may be necessarily increased in light of heat generation in the coil.

(Comparative Example 1)

Figures 8, 9:
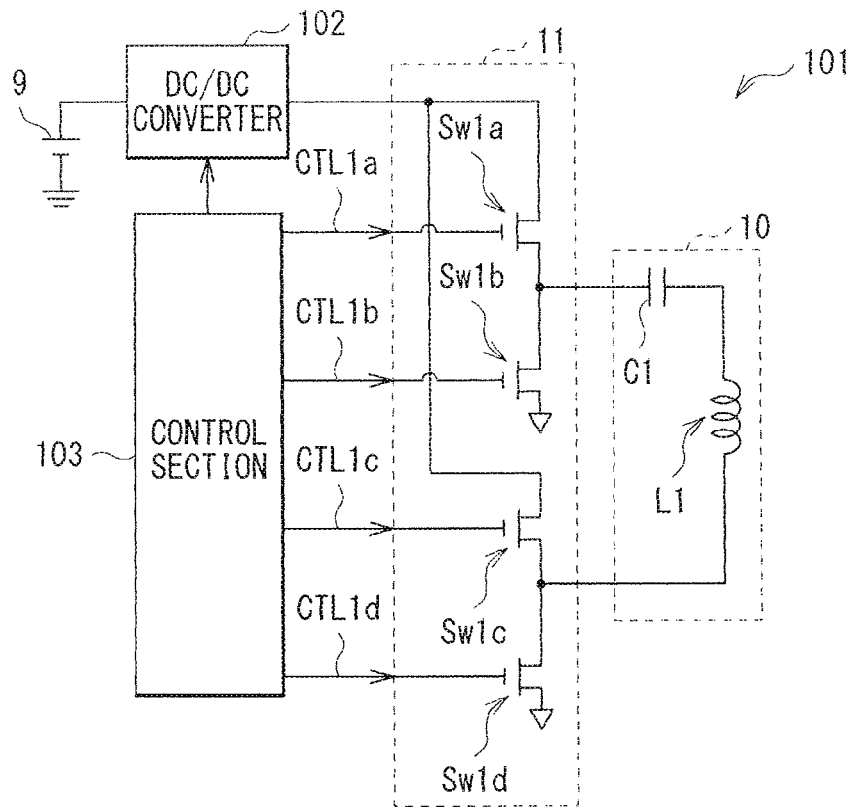
FIG. 8 is a circuit diagram illustrating a configuration of a power feeding unit according to a comparative example 1.
FIG. 9 is a table for explaining loss in a DC/DC converter illustrated in FIG. 8.

In a power feeding unit 101 according to a comparative example 1 illustrated in FIG. 8, therefore, a DC/DC converter 102 is provided in a primary unit (a power feeding unit 101) and is used to adjust a voltage to be fed. The power feeding unit 101 corresponds to an alteration of the power feeding unit 1, in which the DC/DC converter 102 is provided between the external power supply 9 and the AC signal generation circuit 11, and a control section 103 provided in place of the control section 13 controls operation of the DC/DC converter 102.

The power feeding unit 101 controls a voltage to be fed through control of a voltage, which is to be sent to the AC signal generation circuit 11, by the DC/DC converter 102. For example, when power requested by the secondary unit is small compared with a source voltage of the external power supply 9, the DC/DC converter 102 lowers the source voltage, and outputs the lowered voltage.

The technique of the comparative example 1, however, inevitably causes power loss in the DC/DC converter 102, while the technique gives a wide voltage adjustment range from the source voltage to a lowest output voltage of the DC/DC converter 102.

Specifically, for example, power loss in the DC/DC converter 102 is as shown in a table of FIG. 9. In the table, necessary power to be fed corresponds to the sum of necessary power to be received and power loss in the power feeding system as a whole due to the noncontact power feeding. In the noncontact power feeding system, power loss mainly occurs in each of an electricity reception circuit containing a rectifier circuit, etc., an electricity transmission circuit using a MOS transistor, etc., and a coil. Hence, even if the power feeding system as a whole has an efficiency of 80%, and even if the DC/DC converter 102 has an efficiency of 90%, as illustrated in FIG. 9, when power to be received is, for example, 10 W or higher, power loss of 1 W or higher may occur in the DC/DC converter 102.

In the power feeding unit 1 of this embodiment, therefore, as illustrated in FIG. 3, no DC/DC converter is provided between the external power supply 9 and the AC signal generation circuit 11. As illustrated in FIGS. 5A and 5B, in the AC signal generation circuit 11, the circuit configuration is allowed to be switched between the full-bridge circuit and the half-bridge circuit in accordance with the control signals CTL1*a*, CTL1*b*, CTL1*c*, and CTL1*d*. As a result, it is possible to vary a voltage during power feeding in correspondence to control of switching operation without varying a hardware configuration. Specifically, for example, when the necessary power to be fed is low (for example, 5 W or lower), the circuit configuration may be set to the half-bridge circuit. When the necessary power to be fed is high (for example, 10 W or higher), the circuit configuration is switched to the full-bridge circuit. As a result, it is possible to supply an appropriate voltage to be fed. Moreover, omission of the DC/DC converter 102 improves efficiency compared with the comparative example 1.

This technique, however, has an important issue of switching timing of the circuit configuration of the AC signal generation circuit 11 (increasing timing of the power to be fed and the voltage to be fed). Specifically, for example, difficulties of comparative examples 2 and 3 described below may occur depending on such timing.

(Comparative Example 2)

Figure 10:
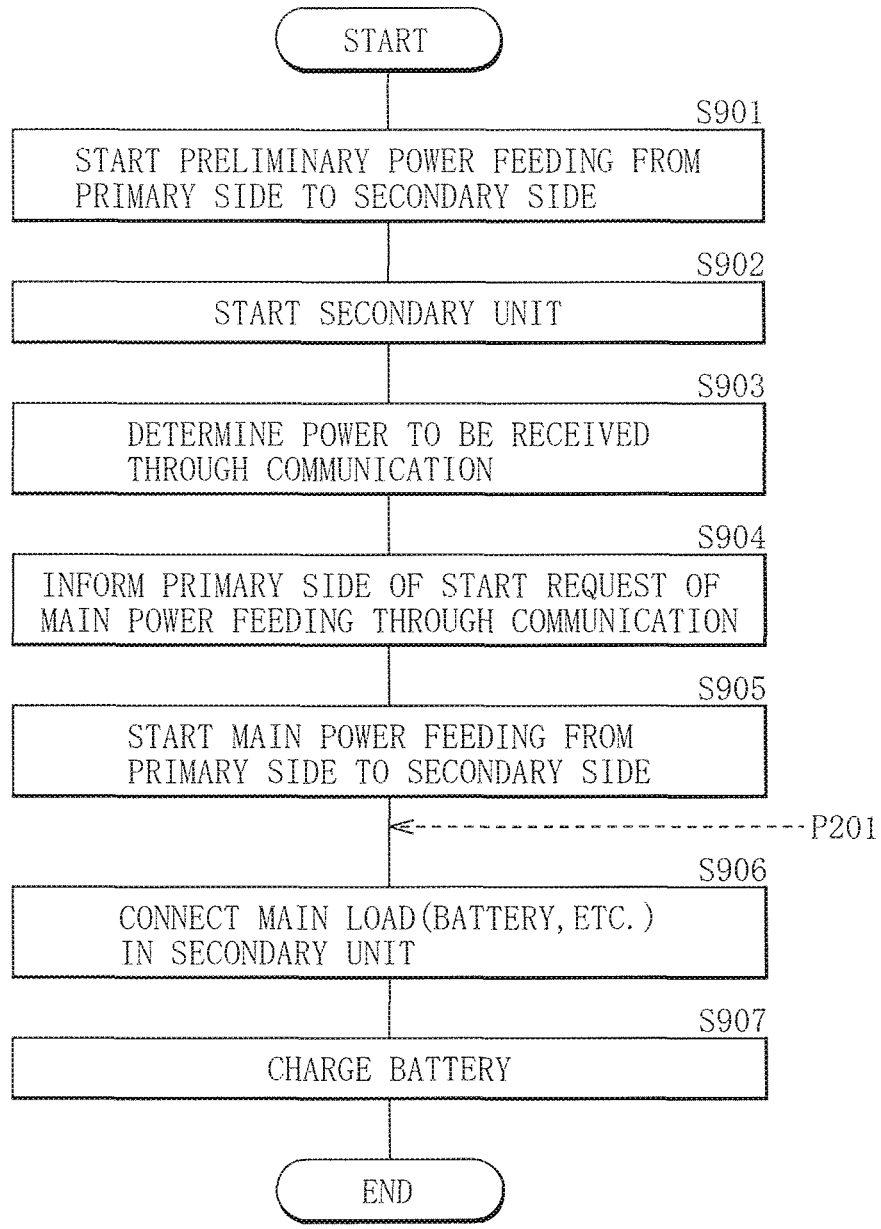
FIG. 10 is a flowchart illustrating power feeding operation and charge operation according to a comparative example 2.

FIG. 10 is a flowchart illustrating power feeding operation and charge operation according to the comparative example 2. In the power feeding operation and charge operation of the comparative example 2, first, preliminary power feeding at a lower power than main power feeding described later is started from the primary unit to the secondary unit (step S901 in FIG. 10). The secondary unit is then started using the power received through the preliminary power feeding (step S902). In such preliminary power feeding, since the necessary power to be fed is lower than in the main power feeding, the AC signal generation circuit 11 in the primary unit is set to the half-bridge circuit.

Subsequently, the secondary unit determines power to be received during the main power feeding through communication between the primary unit and the secondary unit (step S903). The secondary unit then informs, using the communication, the primary unit of a start request of main power feeding (step S904).

Subsequently, the main power feeding at a higher power than the preliminary power feeding is started from the primary unit to the secondary unit (step S905). In other words, in the main power feeding, since the necessary power to be fed is higher than in the preliminary power feeding, the AC signal generation circuit 11 in the primary unit is switched from the half-bridge circuit to the full-bridge circuit.

Subsequently, a main load (the battery, etc.) is set to a connection state in the secondary unit (step S906), and operation of charging the battery is performed based on the received power in the secondary unit (step S907). This is the end of the power feeding operation and charge operation illustrated in FIG. 10.

Thus, in the power feeding operation and charge operation of the comparative example 2, the circuit configuration of the AC signal generation circuit 11 in the primary unit is switched (the power to be fed is controlled to be increased) before connection of the main load in the secondary unit. In the comparative example 2, therefore, the following issue may occur at timing indicated by an arrow P201 in FIG. 10. Specifically, when the circuit configuration is switched (the power to be fed is controlled to be increased) before connection of the main load, the received voltage is increased about two times in a no-load state; hence, an excessively high received voltage may be caused in case of a high coupling coefficient between the electricity transmission coil and the electricity reception coil. Such an excessively high received voltage may result in breakage of an integrated circuit (IC) and the like in the secondary unit. If an element withstanding voltage (withstanding voltage of an integrated circuit (IC), etc.) in the secondary unit is designed to be high, no issue occurs. In such a case, however, manufacturing cost may increase, or may be disadvantageously increased in size.

(Comparative Example 3)

Figure 11:
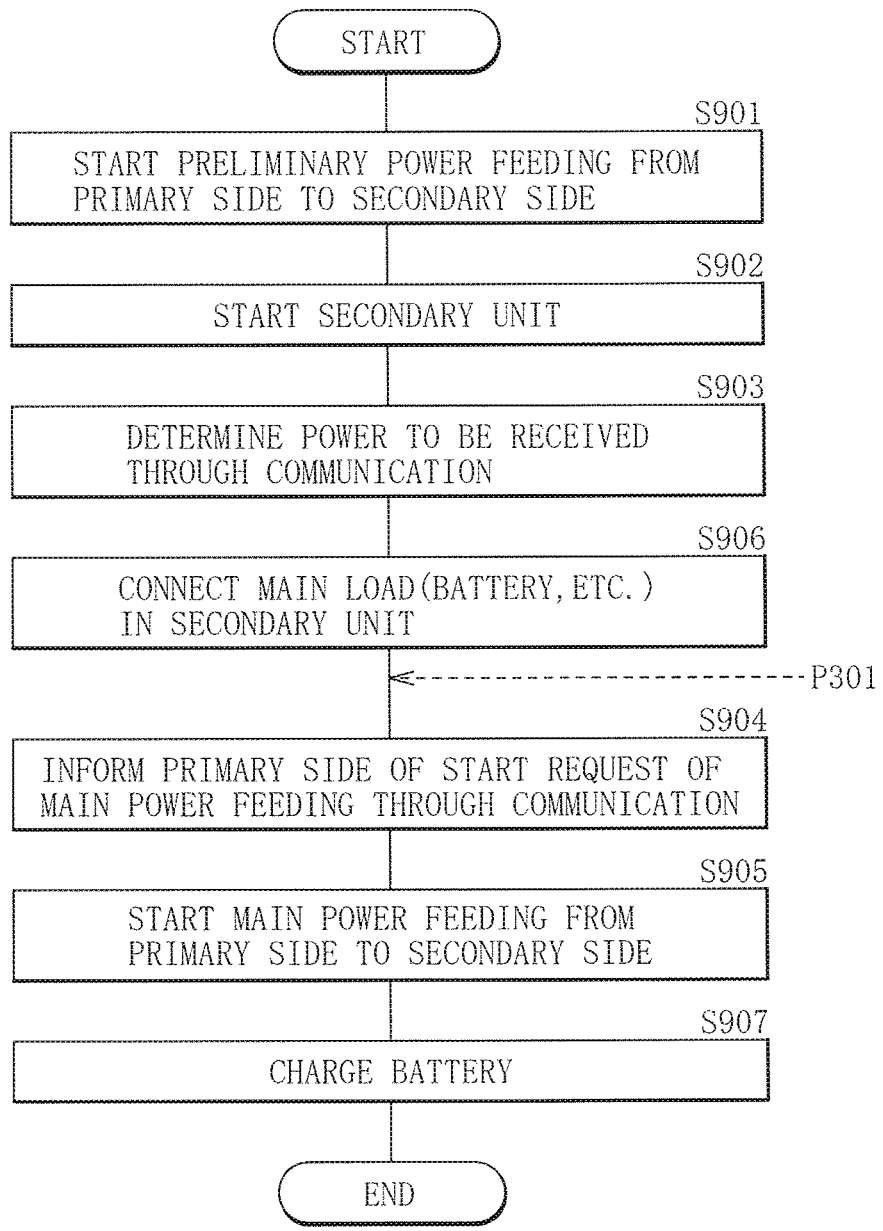
FIG. 11 is a flowchart illustrating power feeding operation and charge operation according to a comparative example 3.

On the other hand, FIG. 11 is a flowchart illustrating power feeding operation and charge operation according to the comparative example 3. The power feeding operation and charge operation of the comparative example 3 corresponds to an alteration of the power feeding operation and charge operation of the comparative example 2, in which connection of the main load in the secondary unit (step S906) is performed before information of a start request of main power feeding (step S904) and start of main power feeding (step S905). In other words, in the comparative example 3, the circuit configuration of the AC signal generation circuit 11 in the primary unit is switched (the power to be fed is controlled to be increased) after connection of the main load in the secondary unit, contrary to the comparative example 2.

In the comparative example 3, however, the following issue may newly occur at timing indicated by an arrow P301 in FIG. 11. Specifically, in this case, since the main load is connected (a current is drawn to a main load side) before power to be fed is increased, received voltage may be extremely decreased, so that ICs in the secondary unit may be disabled.

Thus, in the noncontact power feeding system, since the coupling coefficient is not constant depending on the situation during power feeding, etc., switching timing of the circuit configuration of the AC signal generation circuit 11 (increasing timing of the power to be fed and the voltage to be fed) is difficult to be determined. In a possible technique, the circuit configuration of the power feeding system as a whole is switched at a certain timing. In this case, however, each of the primary unit and the secondary unit is necessary to have a timer. In addition, disadvantageous delay may actually occur due to communication. Moreover, such a switching technique may not be necessarily performed at any time in the primary unit. Hence, the secondary unit may necessarily have a mechanism that prevents any trouble even if its circuit configuration is switched.

(Embodiment)

This embodiment, therefore, solves the above-described issues in the electronic unit 2 as the secondary unit in the following manner.

Specifically, while preliminary power feeding at a lower power than the main power feeding is performed from the power feeding unit 1, and when the DC received voltage Vdc detected by the voltage detection section 22 is equal to or higher than a predetermined threshold voltage Vth (Vdc≥Vth), the control section 27 in the electronic unit 2 performs the following voltage reduction control. Specifically, in such a case, the control section 27 performs the voltage reduction control such that the DC received voltage Vdc is decreased to lower than the threshold voltage Vth (Vdc<Vth). More specifically, the control section 27 may use one or more of the dummy loads in the dummy load circuit 23 to perform such voltage reduction control. A series of power feeding operation and charge operation containing such voltage reduction control is now described in detail.

Figure 12:
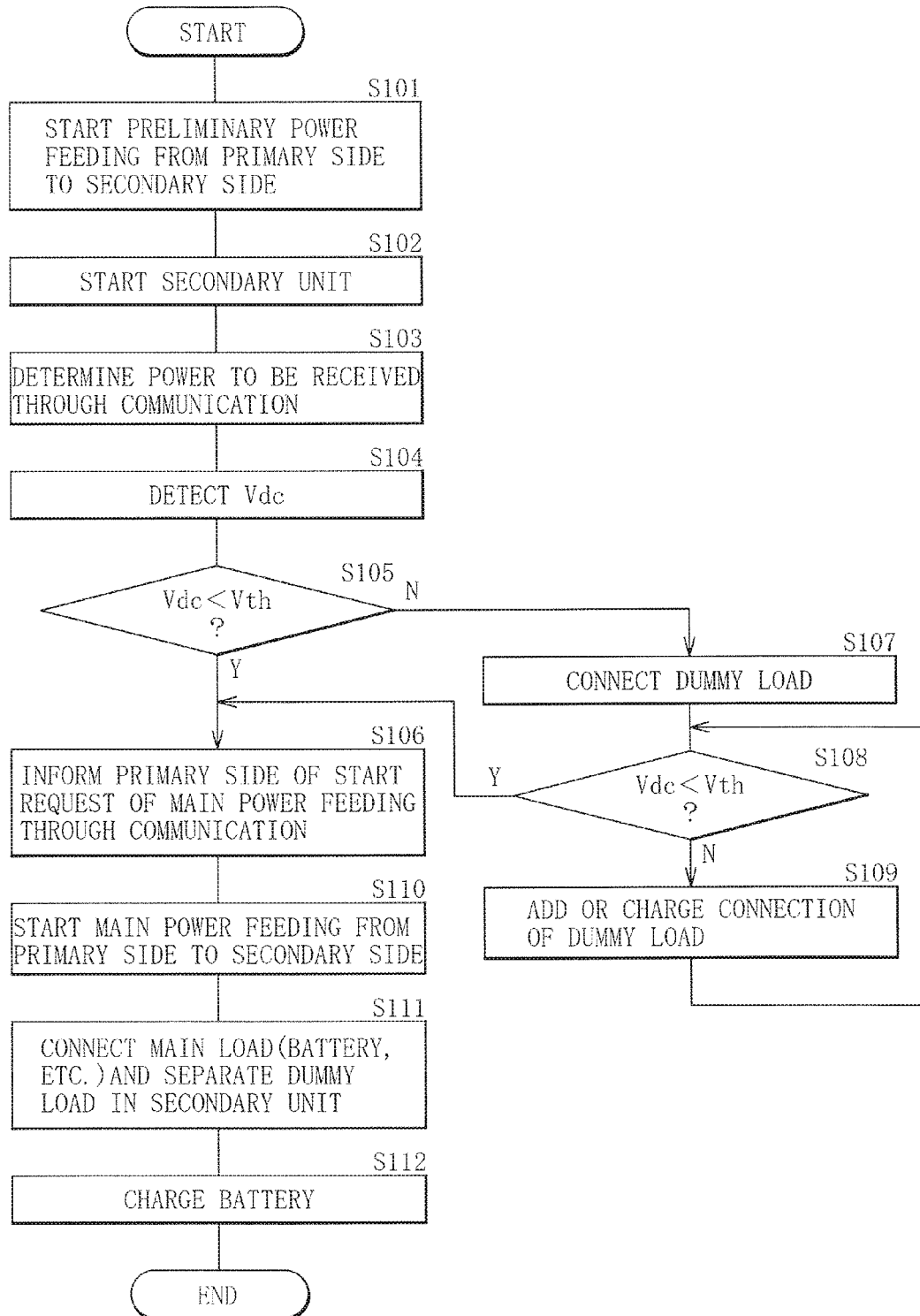
FIG. 12 is a flowchart illustrating an exemplary power feeding operation and charge operation according to the example embodiment.

FIG. 12 is a flowchart illustrating power feeding operation and charge operation of this embodiment. In this power feeding operation and charge operation, first, preliminary power feeding at a lower power than the main power feeding is started from the power feeding unit 1 to the electronic unit 2 (step S101 in FIG. 12). The electronic unit 2 is then started using the power received through the preliminary power feeding (step S102).

Subsequently, the electronic unit 2 (control section 27) determines power to be received during the main power feeding through communication between the primary unit and the secondary unit (step S103). In the preliminary power feeding, since the necessary power to be fed is lower than that in the main power feeding, the AC signal generation circuit 11 in the power feeding unit 1 is set to the half-bridge circuit, as with the above-described comparative examples 2 and 3.

Figure 13:
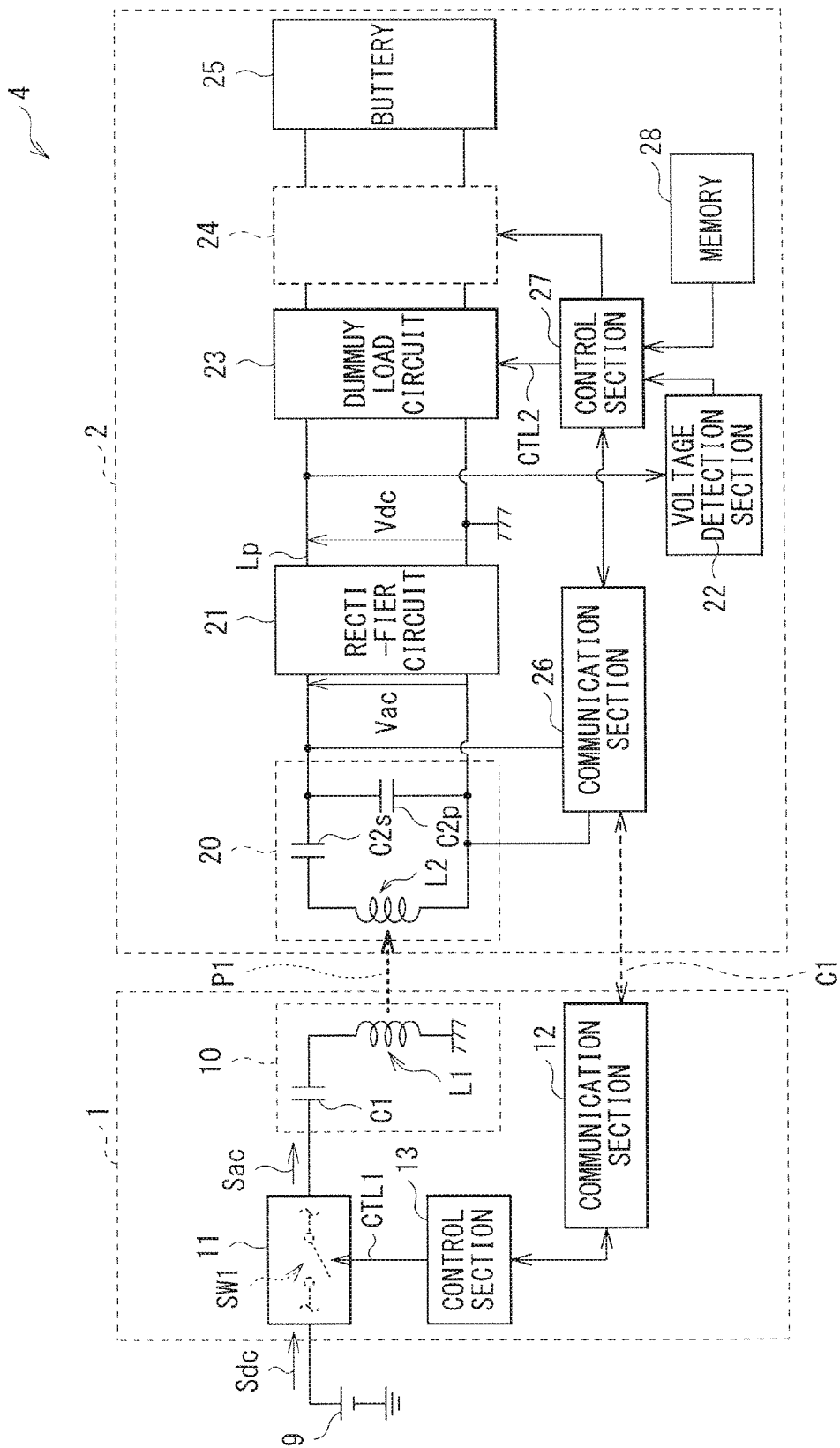
FIG. 13 is a diagram illustrating an exemplary operation state during preliminary power feeding.

In such preliminary power feeding, for example, as illustrated in FIG. 13, the control section 27 controls the charge section 24 to be in a non-operation state, thereby the main load (the battery 25 in this exemplary case) is set to be disconnected from the power supply line Lp.

Subsequently, the voltage detection section 22 in the electronic unit 2 detects the DC received voltage Vdc given in the preliminary power feeding (step S104), and then informs the power feeding unit 1 of a start request of the main power feeding based on the power to be received determined in step S103 (step S106 described later). The control section 27 then determines whether the detected DC received voltage Vdc is lower than the predetermined threshold voltage Vth (Vdc<Vth) or not (step S105).

Figure 14:
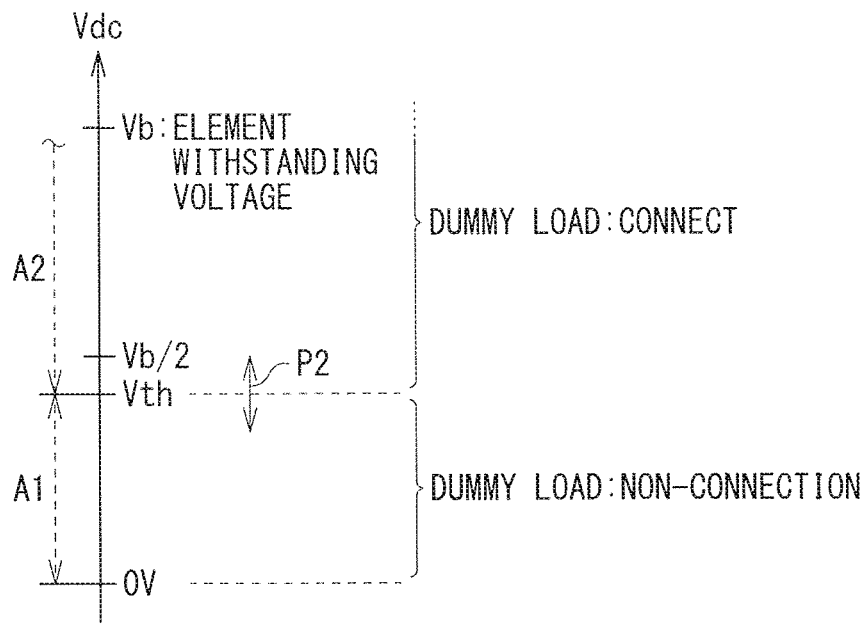
FIG. 14 is a diagram illustrating an exemplary relationship between a received voltage and a dummy load.

For example, as illustrated in FIG. 14, the threshold voltage Vth is set to a value that is less than half the value of an element withstanding voltage Vb in the electronic unit 2 (Vth<(Vdc/2)). This is because when the circuit configuration of the AC signal generation circuit 11 is switched from the half-bridge circuit to the full-bridge circuit as described above, the value of the received voltage (DC received voltage Vdc) is estimated to be accordingly increased about two times. In other words, when a value of the threshold voltage Vth is beforehand set such that Vth<(Vdc/2) is satisfied, and even if the DC received voltage Vdc is increased about two times, the value of such an increased DC received voltage Vdc is controlled to be lower than the element withstanding voltage Vb (is avoided from exceeding the element withstanding voltage Vb). For example, in the case where the element withstanding voltage Vb is 24 V, the threshold voltage Vth may be considered to be set to about 10 V in consideration of a margin.

The value of the threshold voltage Vth may not be limited to a fixed value, and, for example, may be a variable value as below. Specifically, first, a voltage difference between the received voltage in the preliminary power feeding and the received voltage in the main power feeding depends on the power to be received. This is because while the received voltage in the preliminary power feeding is constant regardless of the power to be received, if the power to be received is high, the received voltage in the main power feeding is typically necessary to have a large value. Consequently, for example, as illustrated by an arrow P2 in FIG. 14, the value of the threshold voltage Vth may be set to be variable depending on a level of the power to be received. For example, in the case where the element withstanding voltage Vb is 24 V, the value of the threshold voltage Vth may be considered to be set as below depending on a level of the power to be received (set to be gradually decreased with an increase in power to be received).

In the case of power to be received≤5% . . . threshold voltage Vth=14 V.
In the case of 5W<power to be received≤15% . . . threshold voltage Vth=10 V.
(Switching from the half-bridge circuit to the full-bridge circuit is estimated.)
In the case of 15W<power to be received≤30% . . . threshold voltage Vth=8 V.

(The received voltage in the main power feeding is estimated to be increased two times or more from that in the preliminary power feeding.)

When the detected DC received voltage Vdc is determined to be lower than the threshold voltage Vth (Vdc<Vth) (step S105: Y), and even if the process is shifted to the subsequent main power feeding, so that the DC received voltage Vdc is increased about two times, the value of the DC received voltage Vdc does not exceed the element withstanding voltage Vb. Specifically, in this case, the DC received voltage Vdc is not excessively increased in the subsequent main power feeding (at a higher power than the preliminary power feeding). In this case, therefore, the following voltage reduction control is not performed, and the electronic unit 2 informs, using communication, the power feeding unit 1 of a start request of the main power feeding (step S106). Specifically, in this case, as illustrated in FIG. 7, each of the dummy loads Ra and Rb is still set to be disconnected between the supply lines of the DC received voltage Vdc (see a voltage range A1 indicated in FIG. 14).

On the other hand, when the detected DC received voltage Vdc is determined to be equal to or higher than the threshold voltage Vth (Vdc≥Vth) (step S105: N), the following voltage reduction control is performed in the electronic unit 2.

Figure 15:
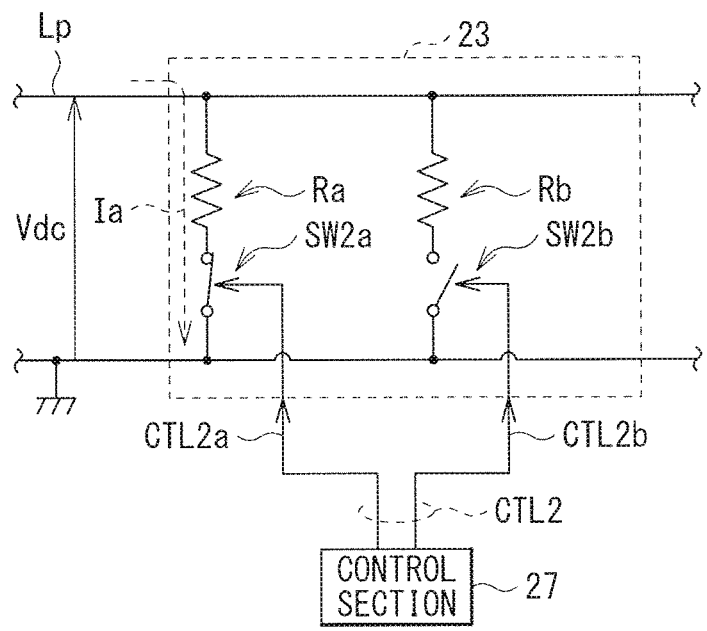
FIG. 15 is a circuit diagram schematically illustrating another exemplary state of the dummy load circuit illustrated in FIG. 6.

Specifically, for example, as illustrated in FIG. 15, first, the control section 27 allows one or more (only the dummy load Ra in this exemplary case) of the dummy loads Ra and Rb in the dummy load circuit 23 to be connected between the supply lines of the DC received voltage Vdc (step S107, see a voltage range A2 indicated in FIG. 14). Specifically, the control section 27 controls the switching element SW2a to be ON, and the switching element SW2b to be OFF. Consequently, as illustrated in FIG. 15, a current Ia flows through the dummy load Ra along the supply line (power supply line Lp) of the DC received voltage Vdc, so that the DC received voltage Vdc is lowered. In this way, reduction control of the DC received voltage Vdc (voltage reduction control) is performed.

After such voltage reduction control is performed, the control section 27 repeatedly determines whether the detected DC received voltage Vdc is lower than the predetermined threshold voltage Vth (Vdc<Vth) or not (step S108). When the repeatedly detected DC received voltage Vdc is determined to be lower than the threshold voltage Vth (Vdc<Vth) (step S108: Y), i.e., when the DC received voltage Vdc is decreased to lower than the threshold voltage Vth by the voltage reduction control, the process is shifted to step S106. Specifically, the electronic unit 2 informs, using communication, the power feeding unit 1 of a start request of the main power feeding. This is because, in this case, the DC received voltage Vdc is also not excessively increased in the subsequent main power feeding.

On the other hand, when the repeatedly detected DC received voltage Vdc is determined to be equal to or higher than the threshold voltage Vth (Vdc≥Vth) (step S108: N), i.e., when the DC received voltage Vdc is still equal to or higher than the threshold voltage Vth after the voltage reduction control is performed, the voltage reduction control is repeatedly performed in the following manner. Specifically, the control section 27 allows a dummy load to be additionally connected between the supply lines of the DC received voltage Vdc in the dummy load circuit 23, or changes the dummy load to a dummy load having a larger load level (for example, a larger resistance value) (step S109). After such repeated voltage reduction control, the process is returned to step S108.

Figure 16A:
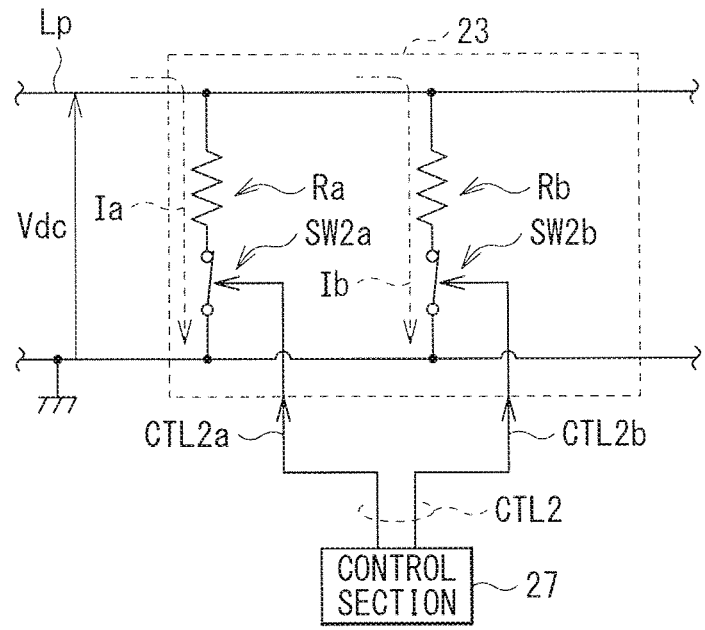
FIG. 16A is a circuit diagram schematically illustrating another exemplary state of the dummy load circuit illustrated in FIG. 6.

When the control section 27 allows a dummy load to be additionally connected, for example, a configuration as illustrated in FIG. 16A is specifically given. Specifically, in this exemplary case, the control section 27 allows not only the dummy load Ra but also the dummy loads Rb to be connected between the supply lines of the DC received voltage Vdc. More specifically, the control section 27 controls both the switching elements SW2a and SW2b to be ON. Consequently, as illustrated in FIG. 16A, currents Ia and Ib flow through the dummy loads Ra and Rb, respectively, along the supply line of the DC received voltage Vdc, so that the DC received voltage Vdc is further lowered. In this way, further reduction control of the DC received voltage Vdc is performed.

Figure 16B:
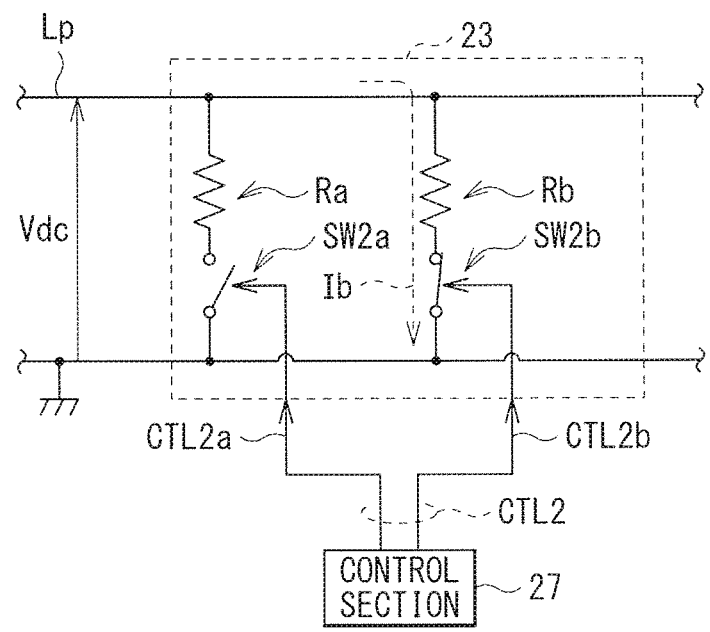
FIG. 16B is a circuit diagram schematically illustrating another exemplary state of the dummy load circuit illustrated in FIG. 6.

On the other hand, when the control section 27 changes a dummy load to a dummy load having a larger load level, for example, a configuration as illustrated in FIG. 16B is specifically given. Specifically, in this exemplary case, when the dummy load Rb has a larger load level than the dummy load Ra, the control section 27 allows the dummy load Rb to be connected between the supply lines of the DC received voltage Vdc in place of the dummy load Ra. More specifically, the control section 27 controls the switching element SW2a to be OFF, and the switching element SW2b to be ON. Consequently, as illustrated in FIG. 16B, the current Ib flows through the dummy load Rb having a larger load level along the supply line of the DC received voltage Vdc, so that the DC received voltage Vdc is further decreased. In this way, further reduction control of the DC received voltage Vdc is performed.

After the power feeding unit 1 is informed of the start request of the main power feeding (step S106) as described above, the main power feeding at a higher power than the preliminary power feeding is started from the power feeding unit 1 to the electronic unit 2 (step S110). In other words, in the main power feeding, as described before, the AC signal generation circuit 11 in the power feeding unit 1 is switched from the half-bridge circuit to the full-bridge circuit.

When the main power feeding is started in this way, the control section 27 sets the circuit such that the battery 25 as a main load is connected to the power supply line Lp in the electronic unit 2 by switching the charge section 24 into an operation state (step S111). Moreover, in step S111, the control section 27 disconnects both the dummy loads Ra and Rb between the supply lines of the DC received voltage Vdc. Specifically, as illustrated in FIG. 7, the control section 27 controls both the switching elements SW2a and SW2b to be OFF. Consequently, the currents Ia and Ib do not flow through the dummy loads Ra and Rb, respectively, and thus the reduction control of the DC received voltage Vdc is stopped.

Subsequently, in the electronic unit 2, the charge section 24 performs operation of charging the battery 25 based on the received power (obtained through the main power feeding) (step S112). This is the end of the power feeding operation and charge operation illustrated in FIG. 12.

As described above, in this embodiment, when the DC received voltage Vdc detected during the preliminary power feeding from the power feeding unit 1 is equal to or higher than the threshold voltage Vth, the control section 27 performs the voltage reduction control so as to decrease the DC received voltage Vdc to lower than the threshold voltage Vth. Consequently, the DC received voltage Vdc is allowed to be avoided from excessively increasing during the subsequent main power feeding. In other words, it is possible to prevent occurrence of overvoltage in the electronic unit 2 due to the feeding voltage control in the power feeding unit 1. Consequently, it is possible to appropriately perform control during the power feeding using a magnetic field.

Moreover, since the element withstanding voltage Vb (such as a rated withstanding voltage, etc.) is allowed to be controlled to be low in the electronic unit 2, for example, chip area and manufacturing cost of IC is allowed to be extremely reduced.

Furthermore, since the voltage reduction technique of this embodiment prevents the above-described occurrence of overvoltage unlike a safety device including, for example, a Zener diode, unstable operation is prevented in the electronic unit 2.

[Modifications]

Modifications (Modifications 1 and 2) of the above-described embodiment are now described. The same components as those in the above-described embodiment are designated by the same numerals, and description of them is appropriately omitted.

[Modification 1]

Figure 17:
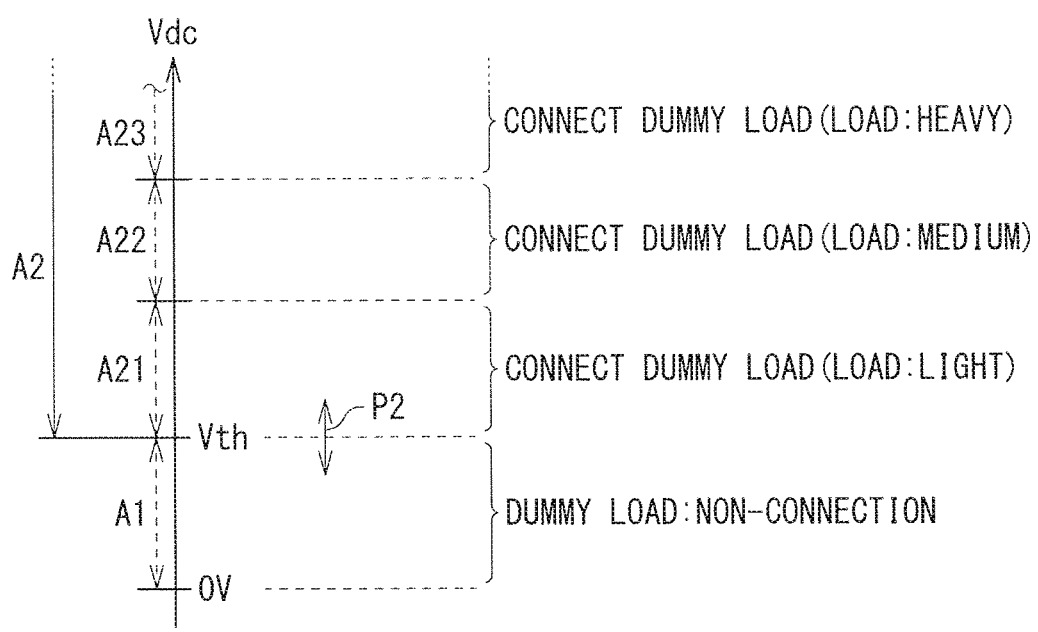
FIG. 17 is a diagram illustrating an exemplary relationship between a received voltage and a dummy load in Modification 1.

FIG. 17 illustrates an exemplary relationship between a received voltage (DC received voltage Vdc) and a dummy load in Modification 1. In Modification 1, a dummy load circuit 23 has a plurality of types (three types in this exemplary case) of dummy loads having different load levels (resistance values, etc.). When the DC received voltage Vdc is determined to be equal to or higher than the threshold voltage Vth, the control section 27 allows a dummy load of a type, which is selected from the plurality of types of dummy loads in accordance with a level of that DC received voltage Vdc, to be connected between the supply lines of the DC received voltage Vdc, and thus performs voltage reduction control.

Specifically, the control section 27 allows a dummy load having a relatively large load level to be connected between the supply lines with an increase in DC received voltage Vdc. Specifically, in the exemplary case illustrated in FIG. 17, the control section 27 switches a type of the dummy load to be connected in order of "load: low", "load: medium", and "load: high" as a value of the DC received voltage Vdc increases in a range of equal to or higher than the threshold voltage Vth (i.e., with shift of a voltage range in order of a voltage range A21, a voltage range A22, and a voltage range A23).

Thus, in Modification 1, a dummy load of a type, which is selected from the plurality of types of dummy loads having different load levels in accordance with a level of the detected DC received voltage Vdc, is allowed to be connected, making it possible to perform more precise voltage reduction control.

Although three types of dummy loads having different load levels are used in the exemplary case illustrated in FIG. 17, two types or four or more types of dummy loads may be used without limitation.

[Modification 2]

Figure 18:
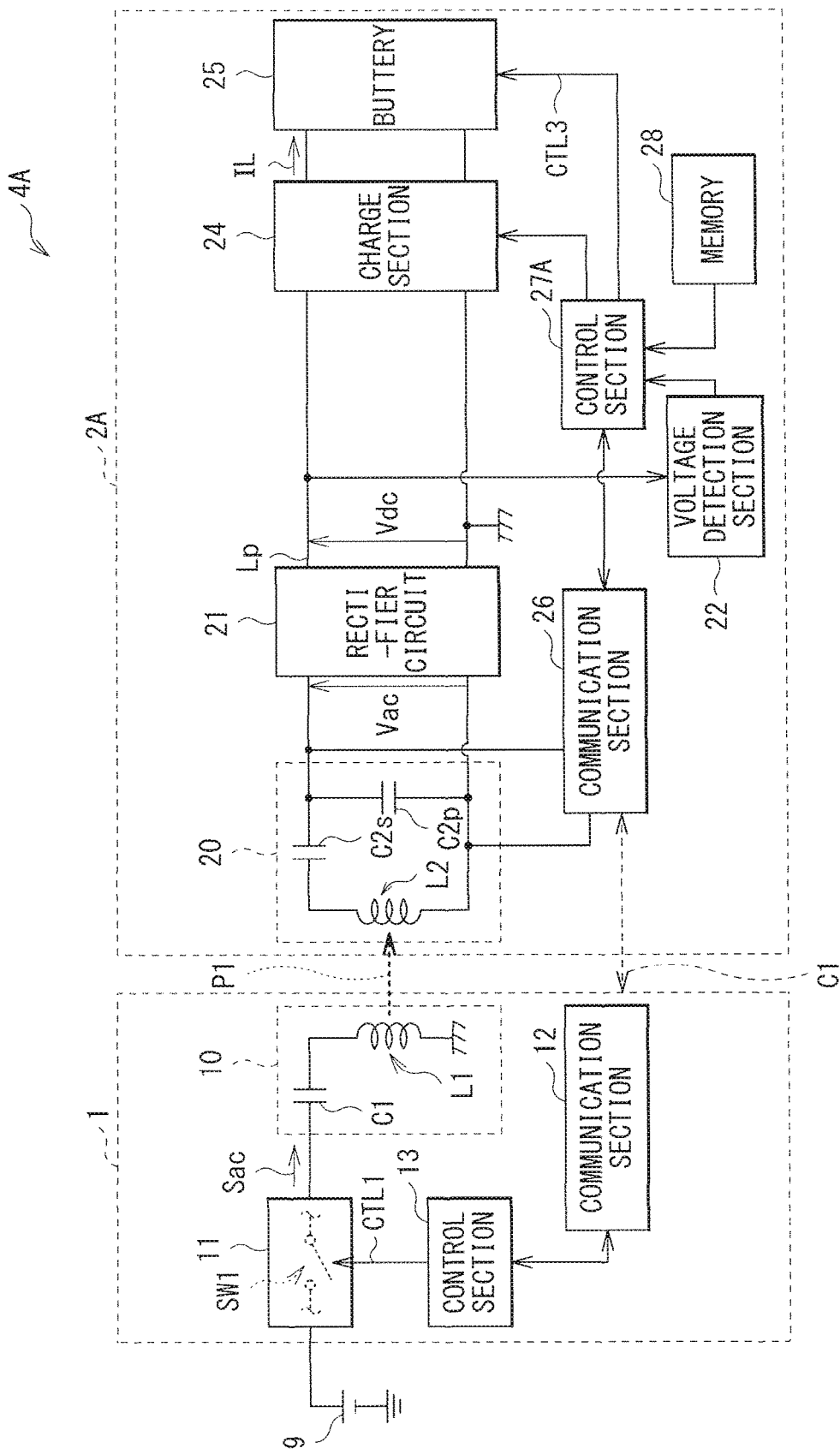
FIG. 18 is a diagram illustrating an exemplary configuration of a power feeding system according to Modification 2.

FIG. 18 is a block diagram as a circuit diagram illustrating an exemplary configuration of a power feeding system (power feeding system 4A) according to Modification 2. The power feeding system 4A of Modification 2 corresponds to a modification of the power feeding system 4 of the above-described embodiment, in which an electronic unit 2A is provided as an objective unit of power feeding in place of the electronic unit 2.

The electronic unit 2A is basically similar to the electronic unit 2 except that the dummy load circuit 23 is not provided (is omitted), and a control section 27A is provided in place of the control section 27.

The control section 27A corresponds to a modification of the control section 27, which further has a function of controlling a load current IL (a charge current flowing from the charge section 24 to the battery 25 as a main load) with a control signal CTL3. Consequently, the control section 27A is allowed to perform reduction control of the received voltage (DC received voltage Vdc) by controlling a level of the load current IL.

Specifically, when the DC received voltage Vdc is determined to be equal to or higher than the threshold voltage Vth, the control section 27A sets an appropriate load (corresponding to a dummy load) while holding the charge section 24 to be in an operation state, and thereby performs control such that a load current IL, which has a level high enough to decrease the DC received voltage Vdc, flows. When the DC received voltage Vdc is decreased to lower than the threshold voltage Vth, the control section 27A then resets the load current IL to an appropriate level. Such control of the load current IL also provides effects similar to those in the case of using the dummy loads in the above-described embodiment.

In addition, the technique of Modification 3 allows effective use of a current unlike the case of using the dummy loads, and therefore makes it possible to improve use efficiency of fed power.

[Other Modifications]

Although the technology according to the present disclosure has been described with an example embodiment and Modifications thereof hereinbefore, the technology is not limited thereto, and various modifications or alterations thereof may be made.

For example, although the above-described embodiment and Modifications thereof are described with various coils (the electricity transmission coil and the electricity reception coil), configurations (shapes) of such coils may include any of various types. Specifically, the coil may have, for example, a spiral shape, a loop shape, a bar shape using a magnetic material, an α-round shape including a spiral coil that is disposed in two layers in a folded manner, a spiral shape in three or more layers, and a helical shape with a winding wound in a thickness direction. Each coil may be not only a winding coil configured of a conductive wire rod, but also a conductive pattern coil configured of a printed circuit board or a flexible printed circuit board.

Although the above-described embodiment and Modifications thereof have been described with an electronic unit as an example of the objective unit of power feeding, the objective unit of power feeding is not limited thereto, and may be a unit (for example, a vehicle such as an electric car) other than the electronic unit.

Furthermore, although the above-described embodiment and Modifications thereof have been described with the specific components of the power feeding unit and the electronic unit, all of the components may not be fully provided. Also, other components may be further provided. For example, the power feeding unit or the electronic unit may incorporate a communication function, a certain control function, a display function, an authentication function of a secondary unit, and a function of detecting contamination of a dissimilar metal, etc. Also, a configuration of the voltage reduction section (dummy load circuit) and a voltage reduction technique are not limited to those described in the above-described embodiment and Modifications thereof, and other configuration and techniques may be applicable. Specifically, the number of dummy loads in the dummy load circuit is not limited to the number (two) described in the above-described embodiment and Modifications thereof, and may be one or three or more.

In addition, although the above-described embodiment and Modifications thereof have been described with an exemplary case where the voltage detection section 22 detects the received voltage (DC received voltage Vdc) that has been rectified by the rectifier circuit 21, this is not limitative. Specifically, for example, a received voltage (an AC received voltage Vdc) that is still not rectified by the rectifier circuit 21 may be detected and used for voltage reduction control. However, since the DC received voltage Vdc is more easily detected than the AC received voltage Vdc, the DC received voltage Vdc may be desirably detected. Also, the position of the dummy load circuit 23 is not limited to a position on a subsequent stage side of the rectifier circuit 21 as in the above-described embodiment and Modifications thereof, and, for example, may be a position on a preceding stage side of the rectifier circuit 21.

Although the above-described embodiment and Modifications thereof have been described with an exemplary case where only one electronic unit is provided in the power feeding system, the power feeding system is not limited thereto, and a plurality of (two or more) electronic units may be provided in the power feeding system.

Furthermore, although the above-described embodiment and Modifications thereof have been described with a charge tray for a small electronic unit (CE unit) such as a mobile phone as an example of the power feeding unit, the power feeding unit is not limited to such a household charge tray, and may be applicable as a charger of any of various electronic units. Moreover, the power feeding unit may not necessarily be a tray, and may be, for example, a stand for an electronic unit, such as a so-called cradle.

It is possible to achieve at least the following configurations from the above-described example embodiments of the disclosure.

(1) An electronic unit, including:
an electricity reception section configured to receive power fed from a power feeding unit using a magnetic field;
a voltage detection section configured to detect a received voltage supplied from the electricity reception section; and
a control section, wherein
while preliminary power feeding at a lower power than main power feeding is performed from the power feeding unit, and
when a received voltage detected by the voltage detection section is equal to or higher than a predetermined threshold voltage, the control section performs voltage reduction control so as to decrease the received voltage to lower than the threshold voltage.

(2) The electronic unit according to (1), further including:
a voltage reduction section including one or more dummy loads,
wherein the control section performs the voltage reduction control using one or more of the dummy loads.

(3) The electronic unit according to (2), wherein
when the received voltage is equal to or higher than the threshold voltage, the control section allows one or more of the dummy loads to be connected between supply lines of the received voltage so as to allow a current to flow through that dummy load, and thus performs the voltage reduction control.

(4) The electronic unit according to (3), wherein
when the main power feeding is started after the preliminary power feeding, and when a main load is then set to a connection state, the control section disconnects the dummy load between the supply lines.

(5) The electronic unit according to (3) or (4), wherein
the voltage reduction section includes a plurality of types of the dummy loads having different load levels, and
when the received voltage is equal to or higher than the threshold voltage,
the control section allows a dummy load of a type, the type being selected from the plurality of types of dummy loads in accordance with a level of that received voltage, to be connected between the supply lines.
(6) The electronic unit according to (5), wherein the control section allows a dummy load having a relatively large load level to be connected between the supply lines with an increase in the received voltage.
(7) The electronic unit according to any one of (3) to (6), wherein
when one or more of the dummy loads has been connected between the supply lines, and when the received voltage is still equal to or higher than the threshold voltage,
the control section allows the dummy load to be additionally connected between the supply lines, or changes the dummy load to a dummy load having a larger load level.
(8) The electronic unit according to (1), wherein the control section performs the voltage reduction control through controlling a level of a load current flowing through a main load.
(9) The electronic unit according to any one of (1) to (8), wherein when the received voltage has been decreased to lower than the threshold voltage, the control section informs the power feeding unit of a start request of the main power feeding.
(10) The electronic unit according to (9), wherein
when the power feeding unit has started the main power feeding,
the control section sets a secondary battery as a main load to a connection state, and allows start of operation of charging the secondary battery based on the main power feeding.
(11) The electronic unit according to any one of (1) to (10), wherein the threshold voltage is set to a value less than half the value of an element withstanding voltage in the electronic unit.
(12) The electronic unit according to any one of (1) to (11), wherein a value of the threshold voltage is varied in accordance with a level of received power received by the electricity reception section.
(13) The electronic unit according to any one of (1) to (12), further including:
a rectifier circuit configured to rectify the received voltage,
wherein the voltage detection section detects the received voltage that has been rectified by the rectifier circuit.
(14) A power feeding system, including:
one or more electronic units; and
a power feeding unit configured to perform power feeding to the electronic unit using a magnetic field,
wherein the electronic unit includes
an electricity reception section that receives power fed from the power feeding unit,
a voltage detection section that detects a received voltage supplied from the electricity reception section, and
a control section, wherein
while preliminary power feeding at a lower power than main power feeding is performed from the power feeding unit, and
when a received voltage detected by the voltage detection section is equal to or higher than a predetermined threshold voltage, the control section performs voltage reduction control so as to decrease the received voltage to lower than the threshold voltage.

It should be understood by those skilled in the art that various modifications, combinations, sub-combinations and alterations may occur depending on design requirements and other factors insofar as they are within the scope of the appended claims or the equivalents thereof.

What is claimed is:
1. An electronic unit, comprising:
an electricity reception section configured to receive power fed from a power feeding unit using a magnetic field;
a voltage detection section configured to detect a received voltage supplied from the electricity reception section; and
a control section, wherein
while preliminary power feeding at a lower power than main power feeding is performed from the power feeding unit, and
when a received voltage detected by the voltage detection section is equal to or higher than a predetermined threshold voltage, the control section performs voltage reduction control so as to decrease the received voltage to lower than the threshold voltage.
2. The electronic unit according to claim 1, further comprising:
a voltage reduction section including one or more dummy loads,
wherein the control section performs the voltage reduction control using one or more of the dummy loads.
3. The electronic unit according to claim 2, wherein
when the received voltage is equal to or higher than the threshold voltage, the control section allows one or more of the dummy loads to be connected between supply lines of the received voltage so as to allow a current to flow through that dummy load, and thus performs the voltage reduction control.
4. The electronic unit according to claim 3, wherein
when the main power feeding is started after the preliminary power feeding, and when a main load is then set to a connection state, the control section disconnects the dummy load between the supply lines.
5. The electronic unit according to claim 3, wherein
the voltage reduction section includes a plurality of types of the dummy loads having different load levels, and
when the received voltage is equal to or higher than the threshold voltage,
the control section allows a dummy load of a type, the type being selected from the plurality of types of dummy loads in accordance with a level of that received voltage, to be connected between the supply lines.
6. The electronic unit according to claim 5, wherein the control section allows a dummy load having a relatively large load level to be connected between the supply lines with an increase in the received voltage.
7. The electronic unit according to claim 3, wherein
when one or more of the dummy loads has been connected between the supply lines, and when the received voltage is still equal to or higher than the threshold voltage,
the control section allows the dummy load to be additionally connected between the supply lines, or changes the dummy load to a dummy load having a larger load level.

8. The electronic unit according to claim 1, wherein the control section performs the voltage reduction control through controlling a level of a load current flowing through a main load.

9. The electronic unit according to claim 1, wherein when the received voltage has been decreased to lower than the threshold voltage, the control section informs the power feeding unit of a start request of the main power feeding.

10. The electronic unit according to claim 9, wherein
when the power feeding unit has started the main power feeding,
the control section sets a secondary battery as a main load to a connection state, and allows start of operation of charging the secondary battery based on the main power feeding.

11. The electronic unit according to claim 1, wherein the threshold voltage is set to a value less than half the value of an element withstanding voltage in the electronic unit.

12. The electronic unit according to claim 1, wherein a value of the threshold voltage is varied in accordance with a level of received power received by the electricity reception section.

13. The electronic unit according to claim 1, further comprising:
a rectifier circuit configured to rectify the received voltage,
wherein the voltage detection section detects the received voltage that has been rectified by the rectifier circuit.

14. A power feeding system, comprising:
one or more electronic units; and
a power feeding unit configured to perform power feeding to the electronic unit using a magnetic field,
wherein the electronic unit includes
an electricity reception section that receives power fed from the power feeding unit,
a voltage detection section that detects a received voltage supplied from the electricity reception section, and
a control section, wherein while preliminary power feeding at a lower power than main power feeding is performed from the power feeding unit, and
when a received voltage detected by the voltage detection section is equal to or higher than a predetermined threshold voltage, the control section performs voltage reduction control so as to decrease the received voltage to lower than the threshold voltage.

* * * * *